No. 871,701. PATENTED NOV. 19, 1907.
J. F. JECKERT.
TOY.
APPLICATION FILED MAR. 16, 1907.
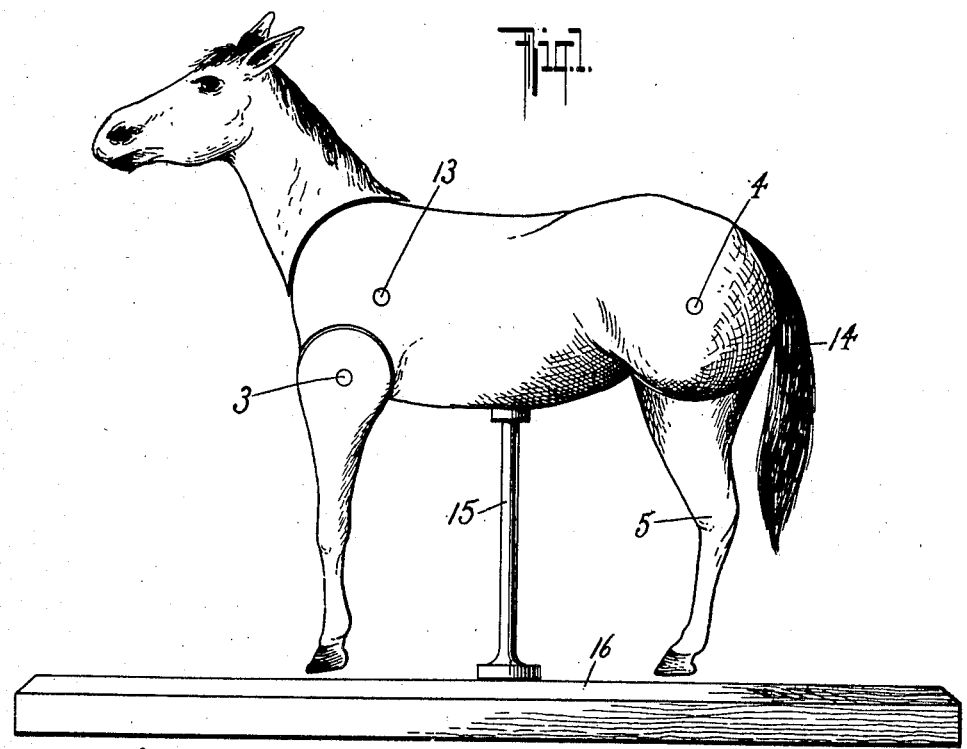
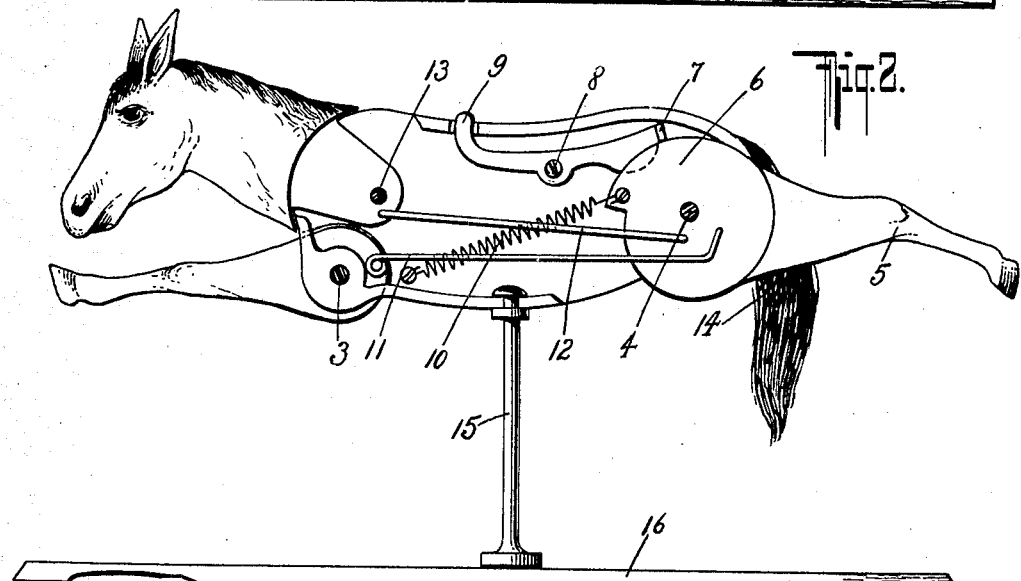
WITNESSES
INVENTOR,
Joseph F. Jeckert,
BY
Victor J. Evans
ATTORNEY

UNITED STATES PATENT OFFICE.

JOSEPH F. JECKERT, OF GARFIELD, NEW JERSEY.

TOY.

No. 871,701.

Specification of Letters Patent.

Patented Nov. 19, 1907.

Application filed March 16, 1907. Serial No. 362,702.

*To all whom it may concern:*

Be it known that I, JOSEPH F. JECKERT, a naturalized citizen of the United States, residing at Garfield, in the county of Bergen and State of New Jersey, have invented new and useful Improvements in Toys, of which the following is a specification.

This invention relates to toys and more particularly to those representing an animal capable of performing motions with its limbs as will be more fully described in the following specification set forth in the claims and illustrated in the accompanying drawings where various reference characters are used to designate like parts in the several figures.

Figure 1 is a side elevation of my improved toy. Fig. 2 is a sectional view of the same showing the limbs occupying a different position.

The device illustrated in the drawings represents a horse or donkey having four legs although but two are shown the same being pivoted on the pins 3 and 4 which pass from side to side of the body and assist in holding same together. The hind legs 5 are provided with shoulders 6 which engage a latch 7 pivoted at 8 to the body of the animal and whose forward end 9 projects upward through the back of same so that it may be operated. Secured to the hind legs near the shoulder 6 is a spring 10 under tension when the legs are occupying a vertical position, the other end of the spring being secured to the body of the animal and connected also with the hind legs is a rod 11 which is attached to the front legs at a point which will cause them to rise to a horizontal position when the hind legs are thrown backward. Another rod 12 connects the hind legs with the head of the animal which is pivoted at 13 and when the legs are thrown to the horizontal position by means of the spring 10 the head is thrown downward.

It will be seen that the spring 10 pulls the upper end of the hind legs against the latch 7 but upon pressure being applied to the end 9 the latch is removed which causes the legs to fly backward to a horizontal position and the front legs and head are moved to similar positions by means of the rods 11 and 12. A downward pressure applied to the front or hind legs of the animal will return the legs and head to their normal positions, in which positions they are retained by the latch 7.

The animal may be provided with a tail 14 and mounted upon a pedestal 15 and base 16. The body may be made in two parts and screwed together or held in place by means of the pins 3 and 4.

When the latch is removed the sudden movement of the limbs of the animal cause it to quickly assume an amusing attitude and affords the beholder much pleasure.

It is obvious that other animal forms may be adopted and their limbs caused to operate in the manner above described and as shown.

What I claim as new and desire to secure by Letters Patent is:

1. In a toy the combination with a body representing an animal, of a head pivoted thereto, front and hind legs, a spring connected with the hind legs, rods connecting the hind legs with the head and with the fore legs and a latch adapted to hold the hind legs against the action of the spring.

2. The combination of a support, a figure mounted thereon, the limbs of the figure being pivotally mounted, a connection between the limbs, a spring secured to the body and to one of the limbs, said spring being adapted to move the limbs, and a latch carried by the body for engagement with one of the limbs to hold the limbs in normal position.

In testimony whereof, I affix my signature in presence of two witnesses.

JOSEPH F. JECKERT.

Witnesses:
JOHN N. ALNOR,
HERMANN JUSCHINSKY.